Jan. 18, 1944.   W. F. FISCHER ET AL   2,339,630
MILLING MACHINE
Filed Nov. 21, 1942   4 Sheets-Sheet 1
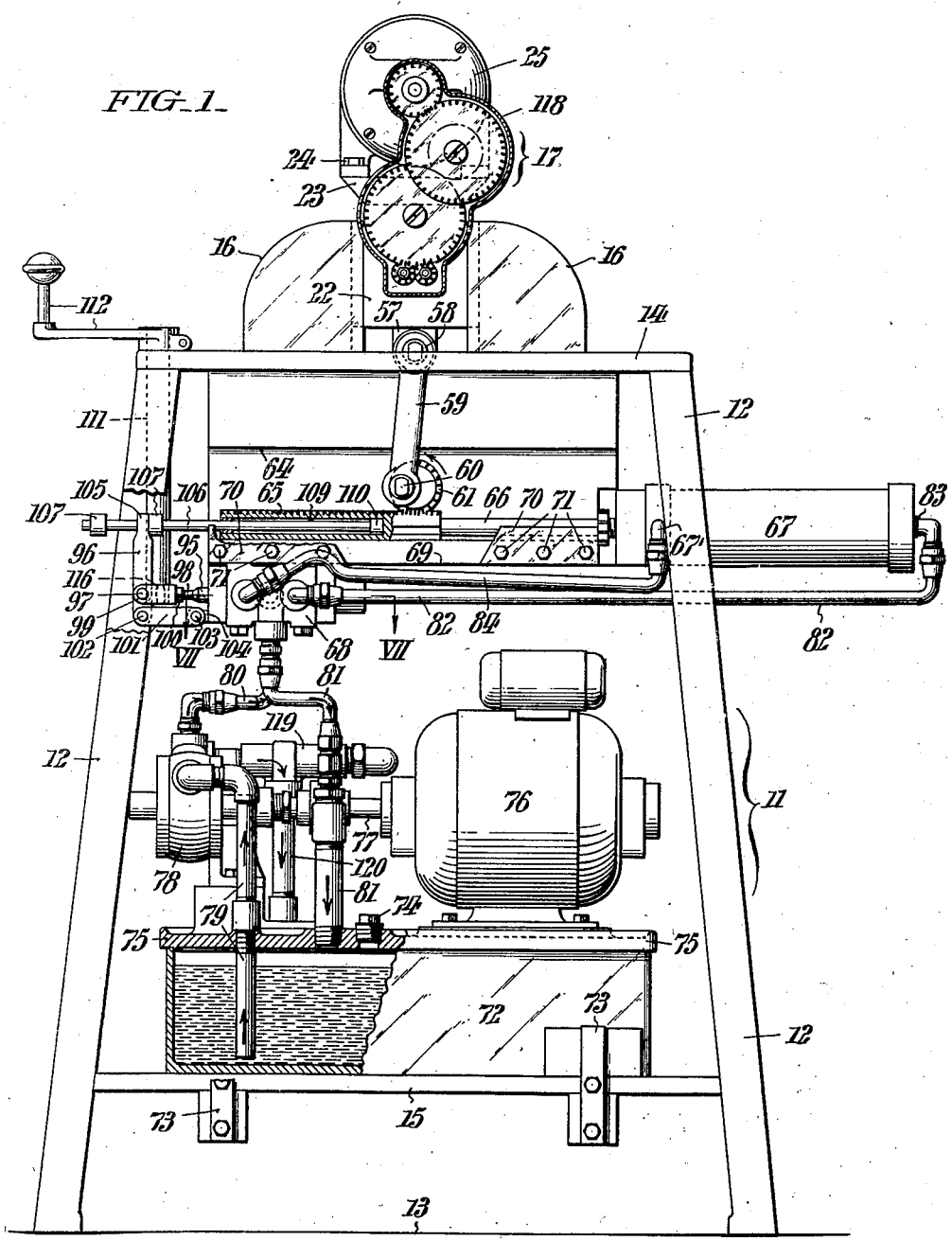
INVENTORS:
William F. Fischer &
Albert F. Fischer,
BY Paul & Paul
ATTORNEYS.

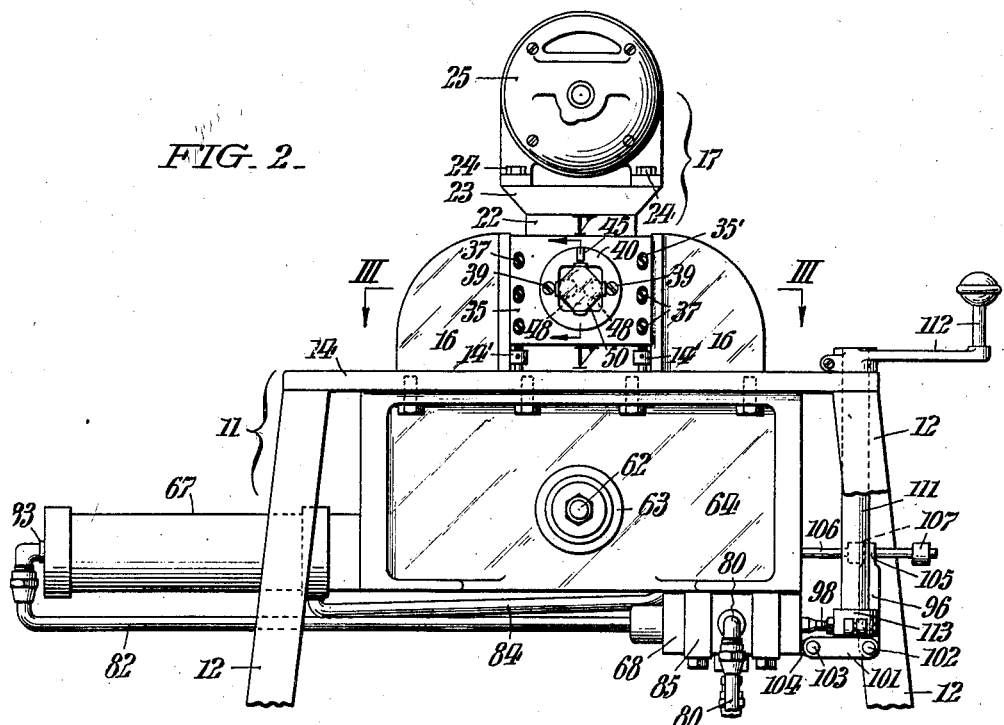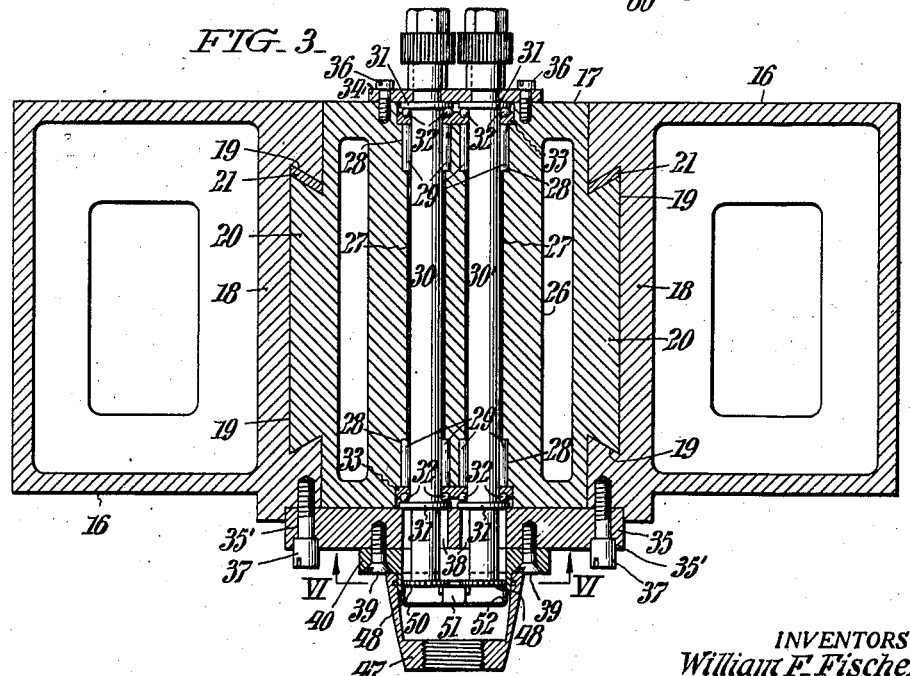

Jan. 18, 1944.   W. F. FISCHER ET AL   2,339,630
MILLING MACHINE
Filed Nov. 21, 1942   4 Sheets-Sheet 3
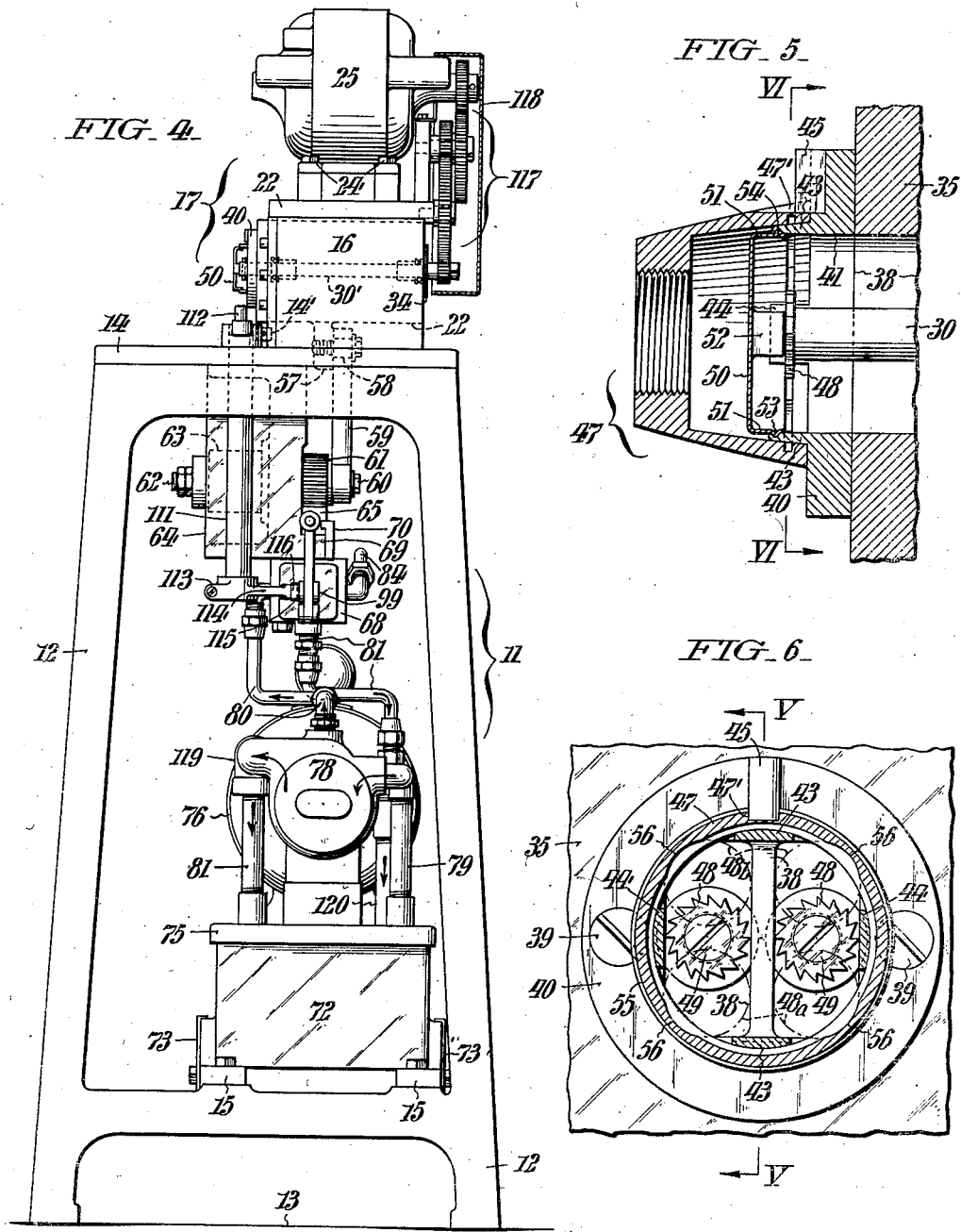
INVENTORS:
William F. Fischer &
Albert F. Fischer,
BY Paul & Paul
ATTORNEYS.

Jan. 18, 1944. W. F. FISCHER ET AL 2,339,630
MILLING MACHINE
Filed Nov. 21, 1942   4 Sheets-Sheet 4

INVENTORS:
William F. Fischer &
Albert F. Fischer,
BY Paul & Paul
ATTORNEYS.

Patented Jan. 18, 1944

2,339,630

UNITED STATES PATENT OFFICE 2,339,630

MILLING MACHINE

William F. Fischer and Albert F. Fischer, Philadelphia, Pa., assignors to Fischer Machine Company, Philadelphia, Pa., a corporation of Pennsylvania Application November 21, 1942, Serial No. 466,400

17 Claims. (Cl. 90—15)

This invention has reference to milling machines and, more particularly, relates to the type designed for forming recesses in the interior of hollow articles or work; while it has for a primary object the provision of novel means whereby relatively opposed segmental cut-outs can be accurately made.

Another object is to provide a novel milling machine for the above stated purpose which enables concurrent cutting of opposed surface recesses with a view to attain the maximum output efficiency from such a machine.

A further object of this invention is the provision of a novel milling machine including holder means for the support of tubular work endwise centrally over laterally spaced rotary cutters, and means for concurrently moving the cutters and the holder bodily at right angles to the plane containing the cutter axes, first in one direction to effect active contact between the cutters and that portion of the internal surface of the tubular work to one side of said plane, and then in the other direction to accomplish similar contact between the cutters and that portion of the inner surface of the tubular work lying to the opposite side of said plane.

A still further object is to provide a milling machine of the species indicated in the preceding paragraph including means whereby said machine automatically stops upon completion of an operative cycle during which all the desired surface recesses are made; as well as manual means for initiating operation of said machine.

While the above stated objects are indicative, in a general way, of the aims of this invention, others, with ancillary advantages, will become evident to those skilled in the art upon an understanding of the construction and operation of the novel milling machine hereinafter disclosed; whereas it will be also understood that variations may be effected, to adapt the invention for other usage than that particularly described herein, without departing from the spirit and scope of the concluding claims.

In the accompanying drawings:

Fig. 1 is a rear elevation of a milling machine embodying this invention, with a fragment removed, and others in section for better disclosure of underlying structure.

Fig. 2 is a fragmentary view in front elevation of the upper portion of the preceding figure; and, as viewed from the reverse side thereof.

Fig. 3 is a horizontal section taken approximately as indicated by the angled-arrows III— III in Fig. 2, and drawn to larger scale for better illustration of the details.

Fig. 4 is an elevation of the machine as viewed from the left, or looking towards the right-hand of Fig. 1.

Fig. 5 is a detail section, taken as indicated by the angled-arrows V—V in Figs. 2 and 6.

Fig. 6 is a vertical section taken on the plane VI—VI of Figs. 3 and 5, as viewed in the direction of the associated arrows.

Figure 7:
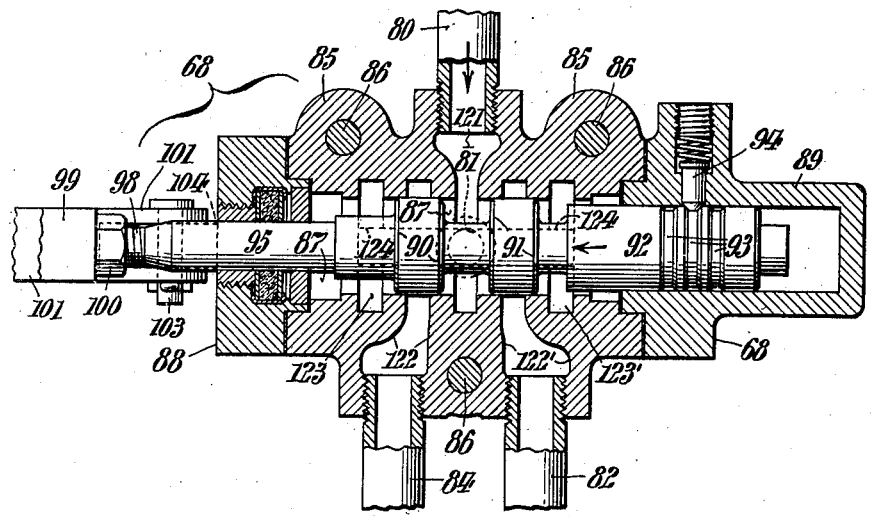
Fig. 7 is a detail section, on the plane VII— VII in Fig. 1, of the valve device which controls means whereby the machine is actuated; said section being drawn to larger scale for better illustration of important details.

Referring more in detail to the drawings the improved milling machine of this invention comprises a frame structure 11, including spaced standards 12, adapted for rigid fixture to a suitable foundation or floor 13. The structure 11 affords support for a bed-plate or table 14, and at an intermediate level another supporting means 15; said parts being appropriately attached together, or formed as an integral unit.

Mounted for vertical reciprocation between spaced blocks 16, on the table 14, is the milling-head comprehensively designated 17 in Figs. 1, 2 and 4. The blocks 16, as best understood from Fig. 3, are conveniently, although not essentially, of hollow formation to include substantial inner-walls 18 having dove-tail section guide-ways 19 in which complementally-shaped lateral projections 20, on the milling-head 17, slidably engage. Obviously, wear elements or shims 21 may be provided intermediate the guide-way inclined portions and the projections 20 as typically shown in Fig. 3.

The milling-head 17 embodies a sub-portion 22, including the dove-tail lateral projections 20 aforesaid and a flaringly-related head 23, affording rigid attachment by appropriate means 24 for an independent cutter-actuating motor 25. The milling-head sub-portion 22 is, preferably, cored out to provide an axial section 26, Fig. 3, embodying spaced horizontal bores 27 which are counterenlarged at 28 to house suitable rollers 29, in turn, affording rotary bearing for laterally separated shafts 30, 30', hereinafter termed the cutter-shafts. Each shaft 30, 30', as best shown in Fig. 3, embodies a pair of collars or flanges 31 located for coaction with ball thrust-bearings 32, the race portions 33 of which conveniently abut the outer ends of the rollers 29, while said parts are maintained in cooperative relation, and restrained from axial shifting, by clamp members 34, 35, respectively, attached to the milling-head sub-portion 22 and to the guide blocks 16, by securing means 36, 37. Thus it will be understood the milling-head 17 is guided, and confined to vertical movement, jointly by the spaced blocks 16 and the clamp member 35 bridging said blocks; the member 35 having elongate slots 38 for passage of the cutter-shafts 30, 30' therethrough, as well as to accommodate the vertical movement of the milling-head 17, as aforesaid. In addition, it is to be particularly noted that the securing means 37 engage through vertical slots 35', Figs. 2 and 3, so that the clamp member 35 can be micrometrically adjusted up or down by appropriate means 14', Fig. 2, for a reason later on set forth.

Figure 8:
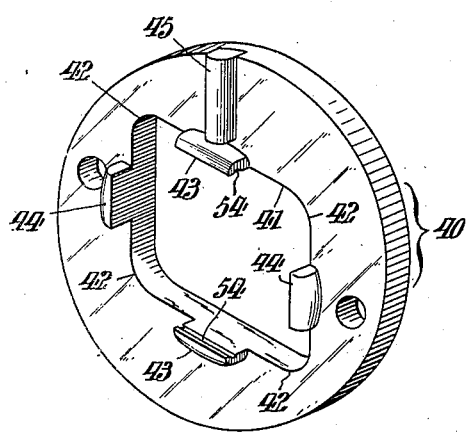
Fig. 8 is a perspective view of the work-holder forming one of the components of the milling-head.

Secured, as by counter-sink screws 39, for example, to the bridging clamp member 35 is the work-holder 40, Fig. 8; said holder, preferably, being in the form of an annulus having a concentrically related rectangular orifice 41, with the corners rounded at 42, as well as embodying intermediate and opposing pairs of lateral projections 43 and 44, preferably at right-angles to one another, in addition to an integral or attached key 45, the purpose whereof will be later on set forth. The outer faces of the projections 43, 44 are conveniently of taper formation, or shaped in conformity with the inner surface 46 of the work 47, Figs. 5, 6 and 9, to be operated on. The milling-cutters 48 are fastened to the extremities of the shafts 30, 30', and said cutters are conveniently held in place by axial securing means 49, in an obvious manner, whereby provision is made for removal and/or replacement by others of different size, as desired.

Figure 10:
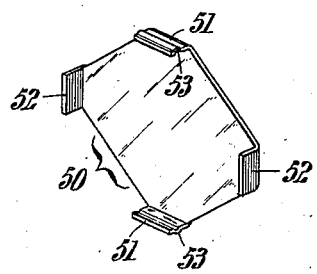

In order to protect the fingers of the operator of the machine from injury by the cutters 48 while retaining the work 47 on the holder 40, use is made of a disc guard 50, Fig. 10, conveniently of rectangular contour; said guard embodying angularly-related diagonally-opposed grip-sections 51, 52, the former of which include ridges 53—in parallel with the general plane of the guard 50—for snap coaction with complemental grooves 54 provided for their reception in the inner faces of the holder projections 43, as readily understood on an inspection of Fig. 5; whereas the grip-sections 52 are plain or smooth-surfaced for frictional engagement between the holder projections 44, as best seen in Fig. 3.

Figure 9:
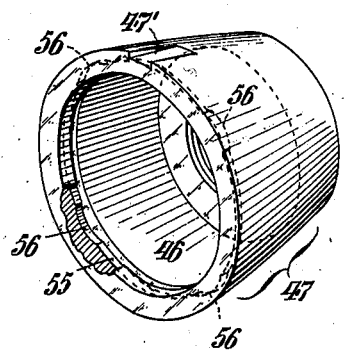
Fig. 9 is a perspective view of a piece of work, such as a projectile cap as milled out by the machine, of this invention, to provide interior and opposing segmental recesses; and, Fig. 10 is a perspective view of a guard element, associated with the milling-head of the machine.

Incidentally, it is here remarked that the work 47 chosen for illustration herein, is an ordnance projectile-cap—Fig. 9—having an interior groove 55 for reception of the customary spring ring, not shown, and in which it is usual to form circumferentially-spaced segmental-recesses 56 for indentation thereinto of said spring ring to lock the cap to the projectile body-shell. The means for forming, or accurately cutting, such recesses, in definite relation, is the fundamental objective of this invention.

Referring now to the means for moving the cutters 48 and the milling-head 17, bodily in a vertical plane; or at right-angles to that including the axes of the cutter-shafts 30, 30'—first in one direction from a neutral position and then in the opposite direction—comprise an apertured lug or projection 57, on the milling-head sub-portion 22, said portion having an appropriate pivot 58 for one end of a pitman 59. The other end of this pitman 59 is eccentrically coupled at 60 to the adjoining end face of a tooth-gear 61, fast to the end of a shaft 62 journaled in the bearing-section 63 of a bracket 64, appropriately secured below the framework table 14. The gear 61, in turn meshes with a rack 65 reciprocative by the connected rod-portion 66 of a piston, not shown, operative in a double-acting pressure cylinder 67 under control of a reversing valve 68, as later on explained; while said rack 65 is slidable in appropriate guide means formed by a lateral projection 69, of the bracket 64 and retainer pieces 70, attached thereto by studs 71, in an obvious manner.

Fluid pressure is constantly supplied to the cylinder 67 from a source of supply such as a closed container or tank 72 conveniently mounted on the supporting means 15 hereinbefore referred to, intermediate the frame standards 12, and held in place by clamp devices 73; said receptacle being fitted with a removable plug 74, in the cover 75, for filling purposes. The cover 75 affords rigid support for an appropriate motor 76, the shaft 77 whereof drives a rotary pump 78, having an intake connection 79 extending down to a low level within the storage tank 72, and an outflow-connection 80 to the reversing-valve 68, while said valve has a return-connection 81 communicating into the tank 72.

Flow of the pressure fluid from the tank 72 for actuation of the piston-connected rod 66 and rack 65, under control of the reversing valve 68, is established by way of a conduit 82 leading from said valve into the outer end of the cylinder 67 at 83; and a second conduit 84 from the valve 68 leading into the inner side portion of said cylinder 67, as indicated at 67' in Fig. 1.

The reversing or lever-operated direction-control valve 68, as best understood from Fig. 7, comprises a body portion 85 adapted for attachment to the bracket 64 by securing means 86, in an obvious manner. The body portion 85 has an axial bore 87, with end closures 88, 89, in which operates the double-acting piston comprising spaced intermediate sections 90—91 and an aligned plunger 92 actuable in the end closure 89. The plunger 92 has spaced circumferential grooves 93, for coaction with an inwardly-influenced detent 94; while an axially aligned extension or rod portion 95, of the piston section 90, extends through the closure 88, for coupler attachment to shifter means, whereby automatic reversal of the valve 68 is effected. This shifter means, best shown in Figs. 1, 2 and 4, comprises a lever 96 pivoted at an intermediate point 97, to the screw-threaded outer end 98 of the piston-rod 95, by a yoke 99 and lock-nut 100, with provision for adjustment; and said lever 96 is fulcrumed at its lower end, by an oscillatable link 101 and pivot means 102, 103, to a lateral projection or lug 104, from the end closure 88. The lever 96 projects upwards and is forked, or otherwise fashioned, at 105 for coaction with a push-and-pull rod 106 intermediate stop collars 107 thereon. The rod 106 operates in a longitudinal bore 109 in the rack 65 with a lost motion connection, and is provided with a piston or collar 110 affording guidance in said bore.

For manual shifting of the valve 68, only when it is in the neutral or non-operative position, shown in Fig. 7; or, in other words, to effect admission of pressure-fluid thereinto at the initially desired end of the cylinder 67, use is made of a vertical shaft 111 appropriately mounted in the frame structure 11, said shaft having at the upper end a crank-handle 112 whereby restricted turning of the shaft 111 is permitted. Adjustably secured to the lower part of the shaft 111, at 113, is a radial arm 114 having the free end 115 shaped for coaction intermediate spaced lateral projections 116 on the yoke 99, as readily understandable from Figs. 1 and 4; or, it will be obvious the end of said radial arm 114 may be bifurcated, for similar coaction with a single projection 116.

Rotary motion is imparted to the cutter-shafts 30, 30', independently of all other parts of the milling machine, through a train of speed-reduction gears 117, Figs. 1 and 4, in a housing 118, intermediate the motor 25 and the milling-head 17; while it is here emphasized that the work-holder 40 is accurately centralized up-or-down, for coincidence with the common plane of the axes of said shafts 30, 30', by aid of the means 14' hereinbefore mentioned, and so rigidly retained thereby.

A suitable pressure-relief valve 119 and associated return-connection 120 is provided between the constantly rotative pump 78 and the tank 72, for diverting the pressure-fluid from the control valve 68 when the latter is in neutral position, or not functioning to raise and lower the milling-head 17; while said control-valve 68, embodies a main in-flow 121, communicating supply-ports 122—122' with associated return-ports 123—123', and a common exhaust 124 to the return-connection 81.

Having outlined the structural features of this invention the operation of the improved milling machine herein disclosed may be briefly described as follows:

Assuming that the tank 72 contains a supply of suitable motive-fluid, such as oil, and that the control valve 68 is in the neutral position of Fig. 7, where it normally is held by the inwardly-influenced detent 94 being engaged in the intermediate groove 93, it will be readily understood that when the motor 76, is set in motion, the pump 78 will simultaneously start and commerce pressure-flow of oil from the tank 72 to the control valve 68. However, as the piston 90—91 is arrested, or held in the neutral position of Fig. 7 by the detent 94, the pressure of the oil builds-up and the relief valve 119 automatically opens to establish a continuous circuit from the tank 72 by way of the intake connection 79, to the pump 78, and from the latter through the relief-valve 119 and return-connection 120 to said tank 72; as conventionally indicated by the arrows on said parts. It is to be noted the condition just explained continues to obtain, as long as the motor 76 is running, without any disturbance whatsoever of the other operative parts of the machine. The operator on applying the work or cap-piece 47, to the holder 40, with a notch 47' therein—Fig. 5—engaging the key 45, next swings the crank-handle 112 in the proper direction to shift the control-valve piston 90—91 to the right-or-left hand, as viewed in Fig. 7, for flow of the pressure fluid into the corresponding end of the cylinder 67, see Fig. 1. This movement of the crank-handle 112 is only possible when the actuator lever 96 is in the vertical position of Fig. 1, inasmuch as the push-and-pull rod end section 110 is arrested in abutment against the inner end of the rack bore 109; in other words, the lever 96 can only rock on the pivot 102 counter-clockwise when the parts occupy the position shown in said Fig. 1. Assuming the piston 90—91, has been manually shifted to the left-hand of Fig. 7, and there arrested by engagement of the detent 94 in the right-hand groove of the series 93, pressure-fluid will be released from the in-flow 121 to the supply-port 122, and by way of the conduit 84 to the inner end of the cylinder 67 at 67' to move the piston therein outwards. Now it will be clearly apparent the piston-rod 66 correspondingly follows the piston in the cylinder 67 and thereby draws the rack 65 in the same direction, with impartation of an initial counter-clockwise semi-rotation to the tooth-gear 61; and, through the pitman 59, effects downward movement of the milling-head 17, as determined by the "throw" of the crank-coupler 60 and the pre-adjusted position of the stop collars 107 on the push-and-pull trip rod 106. In view of this downward movement of the milling-head 17, just explained, and by reference to Fig. 6 more particularly, it will be understood that the constantly-rotating cutters 48 will be lowered from the full-line position of said figure to the dot-and-dash line indication 48a, with resultant formation of the lower pair of spaced segmental-recesses 56 in the groove 55. Incidental to movement of the piston in the cylinder 67, it will also be readily understood that the pressure fluid in advance thereof is simultaneously forced out by way of the connection 83, conduit 82, valve ports 122', 123', common exhaust 124, and return-connection 81 to the storage tank 72, for re-circulation, as aforesaid; or, vice versa when the valve 68 is reversed. Immediately the lower segmental-recesses 56 are formed the cutters 48 are automatically raised, incidental to the further semi-rotation of the gear 61, to the superjacent dot-and-dash line indication 48b, with resultant formation of the upper segmental-recesses 56 in the groove 55, whereupon said cutters are correspondingly lowered to the full-line or neutral position, which is automatically effected by impact of the outer collar 107, on the rod 106, with the actuator lever 96, and arrest of further action on the part of the piston 90—91 by the detent 94 becoming engaged in the intermediate groove of the series 93. It is to be particularly remarked that after each operative cycle of the cutters 48 from the neutral position down and up with return to said position, or vice versa, the valve piston 90—91 is automatically arrested in its normal or non-effective position by the detent 94, and cannot move therefrom in either direction until manually shifted by the crank-handle 112. It is further noteworthy at this juncture that, due to the piston section 110 of the push-and-pull rod 106 abutting the inner end of the rack bore 109, when the piston 90—91 is in the neutral position, the crank-handle 112 cannot be turned otherwise than in the proper direction for initiating down-and-up movement of the milling-head 17. On the other hand, by virtue of the lost-motion provision afforded the push-and-pull rod 106, relative to the actuator lever 96, by the stop collars 107 thereon, elevation of the milling-head 17 may be arrested at any time during the full operative cycle, in event any untoward condition arises that might conduce to accidental injury of the work 47, by simply shifting the crank-handle 112 to move the valve 90—91 into neutral position.

Furthermore, it will be clearly apparent that the respective pairs of recesses 56 are positively formed, and definitely located, with a maximum of precision and in the minimum of time, inasmuch as the operator simply applies the work 47 with one hand to the holder 40, and turns the handle 112 with the other hand in the necessary direction, for each down-and-up operative cycle of the cutters 30, 30a; or vice versa.

From the foregoing it is thought the merits and advantages of this invention will be clearly appreciated by those conversant with the art, and while one practical embodiment has been described, in detail, it is equally obvious that changes and variations in the parts and other arrangements thereof may be made, or said parts can be replaced by other equivalents, without departing from the spirit of said invention. Accordingly the instant disclosure is not to be considered limitative, either as regards the details, or to the specific combination illustrated; while the hereinbefore disclosure is intended to include all modifications and other applications as fairly come within the terms of and reasonable interpretation accorded the following claims.

Having thus described our invention, we claim:

1. A milling machine including spaced rotary cutters; a holder for supporting hollow work centrally over the cutters; and means for moving the cutters bodily at an angle to the plane containing the cutter axes, first in one direction from a neutral position to bring about engagement between the cutters and that portion of the surface of the work lying to one side of said plane, and then in the other direction to bring about engagement between the cutters and that portion of the surface of the work lying to the opposite side of said plane, and finally back to said neutral position to complete an operative cycle.

2. A milling machine according to claim 1, further including means for starting the machine after placement of work on the holder; and means for automatically stopping said machine at the completion of the operative cycle defined in said claim.

3. A milling machine including a pair of laterally-spaced rotary cutters; a holder for supporting tubular work axially central over the cutters; and means for moving the cutters bodily at right angles to the plane containing the cutter axes, first in one direction from a neutral position into active contact with portions of the interior surface of such work lying to one side of said plane, and then in the opposite direction into similar engagement with that portion of the interior surface of said work lying to the other side of said plane, and finally back again to the neutral or starting position for completion of the operative cycle.

4. A milling machine according to claim 3, further including means for manually starting the machine after placement of the work on the holder; and means for automatically stopping it on completion of the operative cycle defined in said claim.

5. A milling machine including a pair of rotary cutters; a holder for supporting tubular work endwise centrally over the cutters; a device affording rotary bearing for the shafts of the cutters; guide means in which said device is movable at right-angles to the plane containing the cutter axes; and means for moving the device first in one direction to bring the cutters from a neutral position within the work into active engagement with that portion of the interior surface of the work lying to one side of said plane, then in the opposite direction to bring the cutters into similar engagement with that portion of the interior surface of the work lying to the opposite side of said plane, and finally back to the neutral position.

6. A milling machine as defined in claim 5, wherein the means for moving the cutter bearing device comprise a shaft having a crank; a pitman connecting the crank to said device; a toothed pinion on said shaft; a rack meshing with said pinion; and means for reciprocating the rack endwise.

7. A milling machine as defined in claim 5, wherein the means for moving the cutter bearing device comprise a shaft having a crank; a pitman connecting the crank to said device; a toothed pinion on said shaft; a rack meshing with said pinion; a cylinder and piston alignedly connected to said rack; and valve means for admitting and exhausting pressure fluid alternately from opposite ends of the cylinder to effect reciprocation of said rack.

8. A milling machine as defined in claim 5, wherein the means for moving the cutter bearing device comprise a shaft having a crank; a pitman connecting the crank to said device; a toothed pinion on said shaft; a rack meshing with said pinion; a pressure-fluid cylinder and piston alignedly connected to said rack; a reversible valve; manual means for shifting said valve to admit pressure fluid into one end of the cylinder to effect movement of the rack in one direction; and means automatically operative when the rack has completed its stroke in said direction to automatically reverse the valve for admission of pressure fluid into the other end of the cylinder to effect movement of the rack in the reverse direction.

9. A milling machine as defined in claim 5, wherein a motor for rotating the cutters is mounted on the bearing device.

10. A milling machine as defined in claim 5, wherein an electric motor and gear transmission rotate the cutters, and said motor is mounted on the cutter bearing device.

11. In a milling machine the combination of a frame structure having a flat top, and other supporting means at an intermediate level; a milling-head vertically-movable above the flat top; laterally-spaced rotatable shafts in the milling-head and having co-planar cutters at one end; an adjustable holder on the milling-head for endwise application thereto of tubular work centrally over the cutters; means for imparting rotation to the cutter-shafts; a crank and coordinated reciprocatory means for moving the milling-head in opposite directions to effect cutting of a pair of spaced recesses within the tubular work, to similarly cut an opposingly-related pair of recesses therein, and to return the milling-head to a neutral position; means for supplying fluid under pressure to actuate the reciprocatory means; a reversible-valve controlling flow of pressure-fluid to and, for automatically moving, the reciprocatory means from and to said neutral position, during each operative cycle; means effective to by-pass the pressure-fluid intermediate each said operative cycle; means for automatically arresting the reversible valve in its neutral position; and manual means for shifting the reversible valve to initiate movement of the reciprocatory means in the desired direction.

12. The combination of claim 11, wherein the milling-head is vertically guided between uprights on the frame structure top, laterally spaced horizontal bores through said head afford rotary bearing for a pair of shafts having co-planar cutters at the one end, a suitable motor is mounted on the milling-head, and speed-reduction gears operatively coordinate the drive shaft of said motor to the other end of the cutter-shafts for rotation in unison.

13. The combination of claim 11, wherein a clamp member is vertically-adjustable by slot-and-securing means relative to stationary projections on the machine frame structure top, said member having elongate clearances for passage of the cutter-shafts; the work-holder is in the form of a removable annulus attached to the clamp member, and said annulus has a concentrically-related rectangular-orifice with opposing pairs of lateral projections as well as a key-projection, for respective reception of the work and for restraining the latter from rotation during formation of the recesses therein.

14. The combination of claim 11 wherein the means for vertically-moving the milling-head comprise a shaft having a tooth-gear thereon; a crank and a pitman coordinate said gear and milling-head; a toothed rack engaging said gear is reciprocative by fluid-operative double-acting cylinder means, a reversing-valve controls automatic supply of operating-fluid under pressure alternately to the respective ends of said cylinder means; a push-and-pull rod operates within a longitudinal bore in the rack, and said rod has a lost-motion connection to associated adjustable trip means for stoppage of the milling-head whenever desirable or expedient during the operating cycle of the milling-head.

15. The combination of claim 11, wherein the means for supplying fluid under pressure, to automatically actuate the reciprocating means, comprise a storage of said fluid, a constantly-rotative circulating-pump having flow connection to the reversible-valve, and pressure-relief means intermediate the pump and fluid storage automatically diverts flow of pressure-fluid from the reversible-valve, when the latter is in neutral position.

16. The combination of claim 11 wherein the means for automatically arresting the reversible-valve in neutral position comprise an end section of said valve having circumferential spaced grooves therein, and an inwardly-influenced detent coacts with an intermediate one of said grooves.

17. The combination of claim 11 wherein the means for manually shifting the reversible-valve comprise a vertical shaft having a crank-handle at the upper end, and an adjustable arm on said shaft coacts with the outer end of said valve, for the purpose stated.

WILLIAM F. FISCHER.
ALBERT F. FISCHER.